United States Patent
Ikeda et al.

[11] Patent Number: 5,095,257
[45] Date of Patent: Mar. 10, 1992

[54] METHOD AND DEVICE FOR CONTROLLING HEADREST IN AUTOMOTIVE SEAT

[75] Inventors: Tetsuo Ikeda; Kiyotaka Takizawa, both of Akishima, Japan

[73] Assignee: Tachi-S Co., Ltd., Tokyo, Japan

[21] Appl. No.: 449,019

[22] Filed: Dec. 11, 1989

[51] Int. Cl.$^5$ .............................. G05B 19/28
[52] U.S. Cl. ................... 318/568.1; 318/603; 318/466; 297/403; 364/424.05
[58] Field of Search .................. 318/15, 55, 434, 443, 318/467, 466, 468, 469, 484, 568; 297/61, 330, 374, 408, 391, 410, 409, 284, 65.1; 364/424.05, 174, 425; 180/6.5, 907; 280/808

[56] References Cited

U.S. PATENT DOCUMENTS

| | | | |
|---|---|---|---|
| 4,222,608 | 9/1980 | Maeda | 297/410 |
| 4,401,928 | 8/1983 | Kamijo et al. | 318/467 X |
| 4,467,252 | 8/1984 | Takeda et al. | 318/603 |
| 4,645,233 | 2/1987 | Bruse et al. | 297/410 X |
| 4,668,014 | 5/1987 | Boisset | 297/410 X |
| 4,669,780 | 6/1987 | Sakakibara et al. | 297/410 X |
| 4,711,494 | 12/1987 | Duvenkamp | 297/403 |
| 4,765,683 | 8/1988 | Hattori | 297/410 |
| 4,797,824 | 1/1989 | Sugiyama et al. | 318/467 X |
| 4,807,934 | 2/1989 | Sakakbara et al. | 297/403 |
| 4,808,897 | 2/1989 | Saito et al. | 318/466 X |
| 4,811,226 | 3/1989 | Shinohara | 364/424.05 |
| 4,812,838 | 3/1989 | Tashiro et al. | 297/330 X |
| 4,935,680 | 6/1990 | Sugiyama | 318/567 |

Primary Examiner—Paul Ip
Attorney, Agent, or Firm—Browdy and Neimark

[57] ABSTRACT

A method and device for controlling a headrest in an automotive seat. The method and device are programmed in a central processing unit, according to which the headrest is firstly raised from the use position upon a seat back, thus making greater the rotation radius along which the headrest is rotated, and then rotatively displaced from the use position to a non-use position, in order to attain a good backward view field at the rear window of the automobile. Thus, no contact is made between the bottom surface of the headrest and upper surface of the seat back, during the displacements of the headrest between its use and non-use positions. The processing steps in the present invention involves detecting a rear-seat occupant, and separate headrest controlling by either of a driver and rear-seat occupant.

10 Claims, 8 Drawing Sheets

METHOD AND DEVICE FOR CONTROLLING HEADREST IN AUTOMOTIVE SEAT

FIELD OF THE INVENTION

The present invention relates to a method and device for controlling a headrest of a rear seat in an automotive seat so as to displace the headrest to a downward non-use position in order for a front-seat driver to attain a good backward view at the rear window of the automobile without hindrance of the rear-seat headrest.

DESCRIPTION OF PRIOR ART

For supporting and protecting the head of an occupant on an automobile seat, a headrest is equipped on the top of a seat back of the seat in a usual way and has been accepted widely as a reliable head safety means.

The headrest on the front seat is not objectionable for a driver thereon because of no hindrance to his or her forward view, but it has been found that the presence of the headrest on the rear seat becomes quite often an obstacle against the backward view field to the eyes of the front-seat driver when driving backward the automobile. Consequently, no clear backward view is attained, making it even difficult to steer the automobile backwardly.

Previously, the inventors of the present invention proposed a headrest control device with computerized control method to solve the foregoing problem. According to that first invention, operation of the remote control switch by a front-seat driver causes displacement of a rear-seat head rest from a head support use position to a non-use position below the backward view filed upon the rear seat. With this prior invention, the rear-seat head rest can be controlled so that it disappears from the backward view of the front-seat driver for clear backward view purpose.

However, although the backward view hindrance is solved by that first technical solution, another drawback has been noticed by the inventors in that a friction occurs between the head rest and rear seat back during displacements of the head rest around the top of the seat back owing to a simple forward/backward rotation of the head rest upon the rear-seat seat back. In other wards, in the above-stated first invention, since the headrest is rotated forwardly and backwardly relative to the rear-seat seat back around a fixed rotation center, the bottom surface of the headrest is in a frictional contact with the upper surface of the seat back, a result of which, both of them are interfered against each other and the covering members of those two elements are worn or abraded to incur a material damage. Further, in view of those headrest and seat back being filled with an elastic padding therein, such frictional contact produces a counterpressure between them against each other with their outwardly expanding properties, which prevents the headrest from being moved easily in a fore-and-aft direction upon the seat back and requires a large-sized motor having a greater drive force enough to overcome such counterpressure of the paddings respectively of the headrest and seat back.

Indeed, to eliminate such drawback, the headrest may be disposed at a higher level from the top of the seat back so as to avoid a contact therebetween. But, in such case, a clearance is created between the headrest and seat back, when the headrest is set at a head support use position, and consequently, the headrest stay is exposed to view, impairing the aesthetic appearance of the seat.

SUMMARY OF THE INVENTION

With the above drawbacks in view, it is a primary purpose of the present invention to provide a headrest controlling method and device which avoids a contact between the bottom surface of the headrest and the upper surface of the seat back during the operation for displacing the headrest towards a non-use position or a use position.

In achievement of such purpose, according to the present invention, when a driver on front seat turns on the driver's control switch for headrest non-use position, the headrest is firstly raised from the seat back at its use position, so as to make longer the radius of a circle along which the headrest is rotated, and then headrest is rotatively displaced down from the use position forwardly of the seat back towards the non-use position. Further, when turning that control switch for headrest use position in order to return the headrest to the initial non-use position from the use position, the headrest is displaced upwardly, maintaining such greater rotation radius, to its use position, and then lowered there to rest upon the seat back.

Accordingly, during the headrest displacement between the use and non-use positions, the bottom of the headrest is kept from contact with the upper surface of the seat back, which eliminates the wear or abrasion problem with a covering member of both headrest and seat back. Advantageously, there is also eliminated a counterpressure between the headrest padding and seat back padding, which prevents easy movement of the headrest upon the seat back, and thus, a small-sized motor with a relatively small torque force can be used, which reduces the weight of the motor per se.

It is a second purpose of the present invention to permit an occupant on a rear seat to adjust the headrest at a desired position.

To attain the purpose, there are further provided headrest fore-and-aft and up-and-down adjustment switches which are to be operated by an occupant on a rear seat. The rear-seat occupant, therefore, can use those two switches (19)(20) to adjust the position of the headrest in a direction forwardly and backwardly of the seat back as well as vertically relative thereto, irrespective of the foregoing driver's control switch.

It is a third purpose of the present invention to provide a safety means for protecting a rear-seat occupant against undesired movement of the rear-seat headrest being controlled by a front-seat driver.

To this end, a pressure sensitive switch is built in the rear seat which detects the presence or absence of an occupant at the rear seat.

Accordingly, if any occupant is present on the rear seat, the pressure sensitive switch detects such presence and sends a signal to a central processing unit which then block any signal from the driver's control switch (17) to thereby prohibit the use thereof by the front-seat driver, permitting only the rear-seat occupant to operate the fore-and-aft and up-and-down switches. Thus, even if the driver by mistake turns on the driver's control switch for moving the rear-seat headrest, with an occupant present on the rear seat, the headrest is automatically prevented against movement, giving no harm and no uneasy psychological state to the rear-seat occupant. On the other hand, if no occupant is seated in the rear seat, a central processing unit blocks any signal from the two headrest adjustment switches for the rear-seat occupant, permitting thus only the front-seat drive to operate the driver's control switch for displacing the headrest between the non-use and use positions.

It is a fourth purpose of the present invention to ensure avoiding any damage to a rear-seat occupant who is apt to move his or her body on the rear seat as well as ensure avoiding unexpected switch-on or switch-off of the pressure sensitive switch in the rear seat.

To this end, the system in the present invention is very sensitive to the slight movement of the rear-seat occupant, and when he or she unintentionally stands up from the rear seat for some other small actions within the automobile, any on-going movement of the headrest is stopped, thereby positively avoiding the a damage or injury at the rear-seat occupant side due to the headrest.

DETAILED DESCRIPTION OF PREFERRED EMBODIMENT OF THE INVENTION

Figure 1:
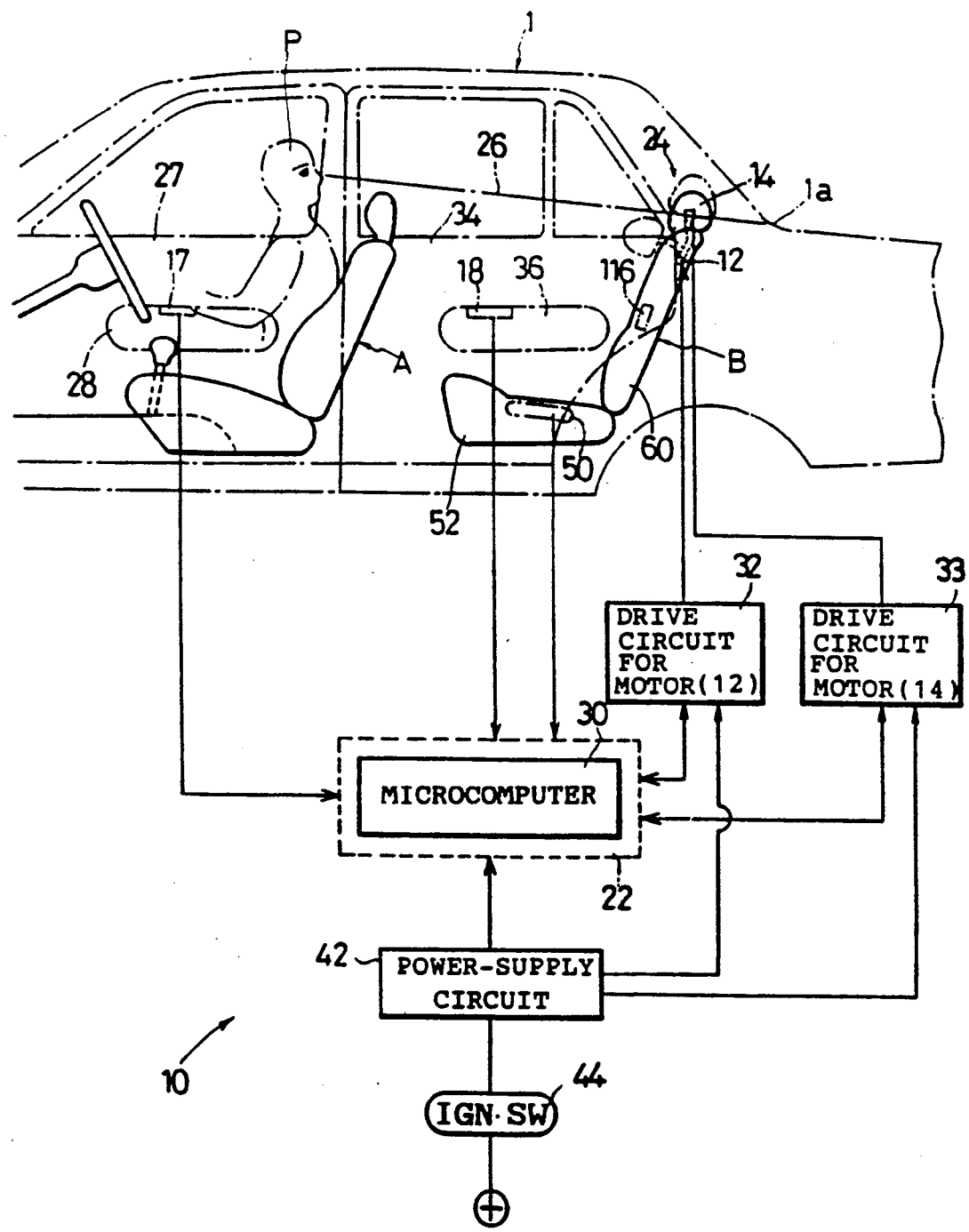
FIG. 1 is a schematic block diagram of a headrest controlling system or device in accordance with the present invention.
Figure 2:
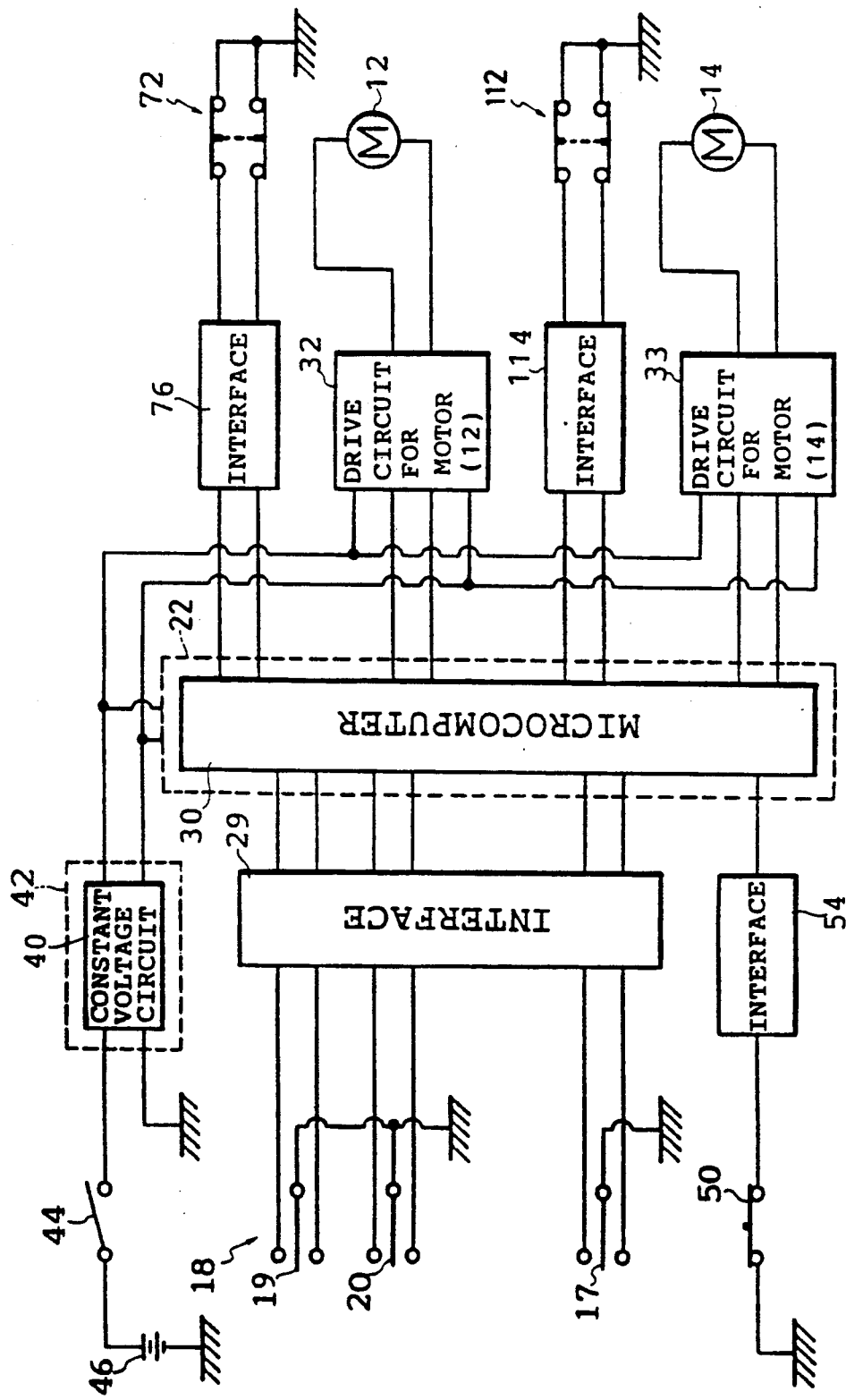
FIG. 2 is a specific view of circuits including a central processing unit, which are incorporated in the headrest controlling system.

FIGS. 1 and 2 illustrate a general view of the headrest control system (10) in terms of mechanical and electronic aspects. Designation (1) denotes a body of an automobile in which is installed such headrest control system (10).

Viewing FIG. 1 generally, the headrest control system (10) is basically comprised of a headrest rotation motor (12) for causing a fore-and-aft rotation of a rear-seat headrest (24) relative to a seat back (60) of a rear seat (B), a headrest elevating motor (14) for causing a vertical movement of the headrest (24) upon the seat back (6), a driver's control switch (17) for controlling the fore-and-aft rotation of the headrest (24) for displacement of the same into a non-use position as will be stated later, a rear-seat occupant's adjustment switch element (18) for adjusting not only the fore-and-aft rotation of the headrest (24) but also the vertical movement thereof, and a central processing unit (22) which is programed for processing specific instructions and effecting various motions of the foregoing elements under the electronic circuits shown in FIG. 2, for purposes to be set forth later.

As shown in FIG. 1, the headrest (24) is mounted upon the top of the seat back (60) of the rear seat (B) in such a manner as to be rotatable upon the seat back (60) forwardly and backwardly with respect to the seat back (60). In other words, the headrest (24) is rotatable between a head support use position (see FIG. 3), where it erects on the top of the seat back (60) in a state ready for supporting the head of a rear-seat occupant, and a non-use position where the headrest (24) is inclined down forwardly of the seat back (60), indicating non-use of the same. Accordingly, with the headrest (24) located at the non-use position, as in FIG. 4, the line of sight (26), which is drawn from the eyes of a driver (P) on a front seat (A) towards the lower edge (1a) of a rear window (not shown) (see FIG. 1), is not interfered by the headrest (24) which is positioned below the sight line (26). In addition, as can be seen from FIG. 3, the headrest (24) is adjustable in forward and rearward positions upon the top of the seat back (60), according to a preference of an occupant on the rear seat (60).

The vertical movement of the headrest (24) is only effected when it is located at the non-use 25 position.

Referring now to FIGS. 1 and 2, the control switch (17) is provided in an armrest (28) integrally fixed on the inner wall of a front door (27). The control switch (17) is of a one-touch, easy type, and operation thereof causes sequential control of the headrest rotation motor (12) and headrest elevating motor (14) to displace the headrest (24) between its use and non-use positions. The switch (17) may be located in a console box within the cabin of the automobile (1) and formed as a self-return, seesaw type one having three switch positions; namely, a neutral switch phase and two switch phases.

As in FIG. 2, the control switch (17) is connected electrically via an interface (29) with the central processing unit (22). Operating the switch (17) emits a signal therefrom towards the interface (29), in which the signal is transformed into a suitable one and then output to the central processing unit (22).

The central processing unit (22) includes a microcomputer (30). The microcomputer (30) is programed previously in the manner shown in FIGS. 7 and 8, and processes various signals input thereinto, according to such preset program, so as to output proper control signals to the peripheral circuits and elements.

Figure 4:
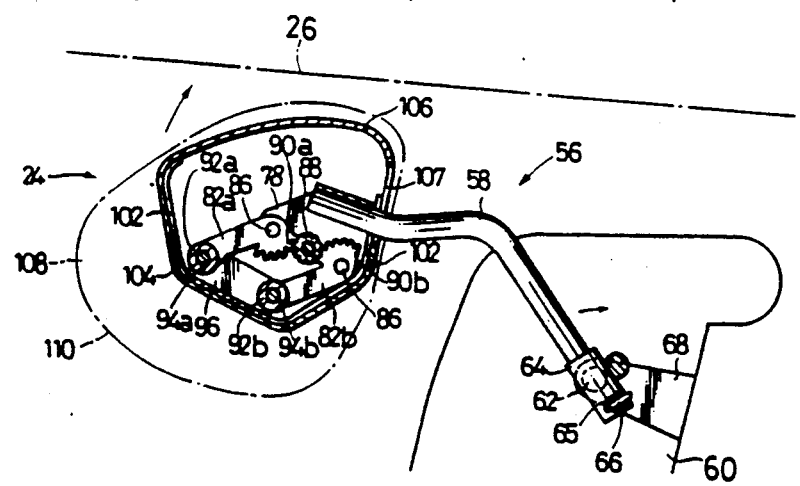
FIG. 4 is a sectional view showing the state wherein the headrest is located at a non-use position forwardly of the seat back.
Figure 5:
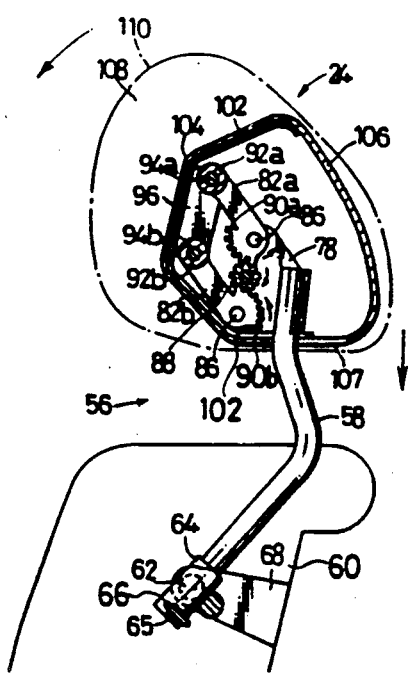
FIG. 5 is a sectional view showing the state wherein the headrest is returned to the use position.

Having regard to the flow of control signal in the foregoing structure, a brief explanation will be given now by way of example, not on the whole, for facilitating the understanding thereof prior to getting into details. Namely, as understandable from FIGS. 1 and 2, certain control signals are output from the microcomputer (30) and sent into a first motor drive circuit (32) associated with the drive of the headrest rotation motor (12) and a second motor drive circuit (33) associated with the drive of the headrest elevating motor (14). Then, the two motors (12)(14) are controlled in drive, sequentially or independently of each other. For example, to displace the headrest (24) from the use position to the non-use one, the drivers's control switch (17) is turned on for a headrest non-use position, and therefore, a signal to that effect is sent from the switch (17) and input via the interface (29) into the central processing unit (22). In response to that signal, the central processing unit (22) outputs to the second motor drive circuit (33) a control signal instructing the headrest elevating motor (14) to drive in a reverse direction to raise the headrest (24), with the result that the headrest (24) is moved upwardly as shown in FIG. 5. Following the upward motion of the headrest (24), another signal is output from the unit (22) to the first motor drive circuit (32), instructing the headrest rotation motor (12) to drive in a reverse direction to rotate the headrest (24) from the use position to the non-use one, and consequently, the headrest (24) is rotated down forwardly of the seat back (60) to the non-use position as shown in FIG. 4.

It is noted that the central processing unit (22) includes a memory area which stores control signals output sequentially to those two motors (12) (14) and keeps them in memory for expediting same subsequent drives of them to cause a smooth displacement of the headrest (24) between its use and non-use positions.

Preferably, the control switch (17) has a memory element which stores its switch operation with a view to preventing the switch (17) from being turned off due to an unexpected contact thereon. For instance, if the switch (17) is turned on for the headrest non-use position, the memory element will place such switch-on state in memory and maintain the "on" state of the switch (17) to permit the headrest rotation motor (12) to go on working even if the switch (17) is turned off. Thus one operation of the switch (17) will keep carrying out an intended motion of the headrest (24).

The rear-seat occupant's adjustment switch means (18) includes a headrest fore-and-aft adjustment switch (19) and a headrest up-and-down adjustment switch (20), as shown in FIG. 2. The switch means (18) is mounted in an armrest (36) fixed integrally on the inner wall of a rear door (34) so that an occupant sitting on the rear seat (B) may easily reach and operate the switch means (18), and the two switch elements (19)(20) thereof are each formed generally in the same way as in the control switch (17). Of course, the two switch elements (19)(20) may be formed as a self-return, seesaw type one having a neutral switch phase and two other switch phases.

As seen from FIG. 2, the two headrest adjustment switches (18)(19) are electrically connected via the interface (29) with the central processing unit (22). Each of signals emitted from the two switches (18)(19) is input and transformed in the interface (29) into a suitable signal, which is in turn input to the central processing unit (22). For example, assuming that the headrest fore-and-aft adjustment switch (19) is turned on for a forward headrest adjustment, then a signal to that effect is emitted therefrom and input to the central processing unit (22). In response thereto, the central processing unit (22) outputs to the first motor drive circuit (32) a control signal instructing the headrest rotation motor (12) to drive in a reverse direction to cause forward rotation of the headrest (24), with the result that the headrest (24) is moved forwardly relative to the seat back (60). Under such state, the switch (19) is turned off to stop the forward movement of the headrest (24) at a desired point, which then interrupts the control signal, thereby ceasing the drive of the motor (12) and locating the headrest (24) at a given forwardly advanced point as can be seen from FIG. 3. Thus, operating the switch (19) enables fore-and-aft adjustment of the headrest (24) upon the seat back (60) to provide an optimum position thereof against the head of rear-seat occupant. On the other hand, to turn on the headrest up-and-down switch (20) for headrest upward adjustment will emit a signal to that effect therefrom, and the signal is input via the interface (24) to the central processing unit (22). Then, the central processing unit (22) outputs to the second motor drive circuit (33) a control signal instructing the headrest elevating motor (14) to drive in a reverse direction to raise the headrest (24). In the middle of the headrest (24) being raised, turning of the switch (20) to stop the upward motion of the headrest (24) at a desired point will interrupt the control signal and cease the drive of the motor (14), so that, as can be seen from FIG. 5, the headrest (24) is positioned at a given higher level according to the desire of occupant. Hence, operation of the switch (20) enables the vertical adjustment of the headrest (24).

The central processing unit (22), first motor drive circuit (32) and second motor drive circuit (33) are electrically connected with a power-supply circuit (42) having a constant voltage circuit (40) incorporated therein, and are further connected via an ignition switch (44) with the positive pole of a battery (46), as shown in FIGS. 1 and 2.

As designated at (50), there is provided an occupant detecting switch of a pressure sensitive type in the seat cushion (52) of the rear seat (B). The occupant detecting switch (50) is electrically connected with the central processing unit (22) via an interface (54), and adapted to detect whether an occupant is seated in the rear seat (60) or not. Because of the pressure sensitive nature, if an occupant sits on the seat cushion (52), the weight of the occupant turns "on" the switch (50). Hereinafter, the switch (50) will be referred to as a "pressure sensitive switch". Thus when an occupant sits on the seat cushion (52), a certain downward pressure is detected by the pressure sensitive switch (50), thereby turning on the same, and then a signal is emitted therefrom and input via the interface (54) to the central processing unit (22). In response to that signal, the presence of the occupant on the rear seat (60) is recognized by the CPU (22) (hereinafter central processing unit (22) will be referred to as "CPU"), and, as will be explained later, the CPU (22) blocks any signal emitted from the driver's control switch (17) to thereby make inoperative the same temporarily, and only permits the rear-seat occupant to operate the headrest fore-and-aft and up-and-down switches (19)(20). In other words, with an occupant taking a seat in the rear seat (B), the CPU (22) rejects signals from the control switch (17), whereupon the driver (P) can not effect the control of the headrest (24) for non-use position even by operating the driver's control switch (17), while by contrast the rear-seat occupant can adjust the headrest (24) in fore-and-aft direction as well as in vertical direction. Reversely, if no presence of the occupant on the rear seat (60) is detected by the pressure sensitive switch (50), then the CPU (22) blocks all signals from both fore-and-aft and vertical adjustment switches (19)(20), and only permits the driver (P) to operate the control switch (17). Therefore, without an occupant on the rear seat (B), the CPU (22) rejects signals sent from those two adjustment switches (19)(20), if any, to insure sole operation of the driver's control switch (17), so that only the driver (P) can control the adjustment of the headrest (24) either in the use position or the non-use position.

The switch (50) may be altered to any other suitable switches such as a photo-electrical sensor.

Reference is made to FIGS. 3 through 6, wherein is shown one preferred embodiment of headrest drive mechanism (56) for effecting the above-described fore- and aft or vertical movements of the headrest (24). While other various mechanisms may be employed, a description will now be made of such headrest drive mechanism (56) as below.

Figure 3:
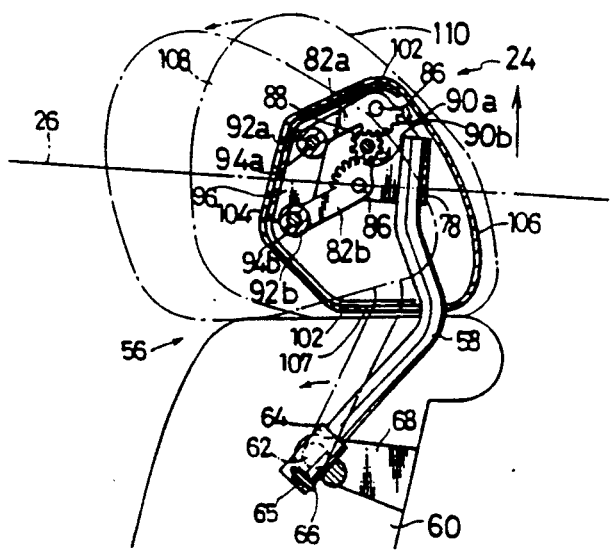
FIG. 3 is a sectional view showing the state wherein the headrest is located at a use position upon the top of a seat back.
Figure 6:
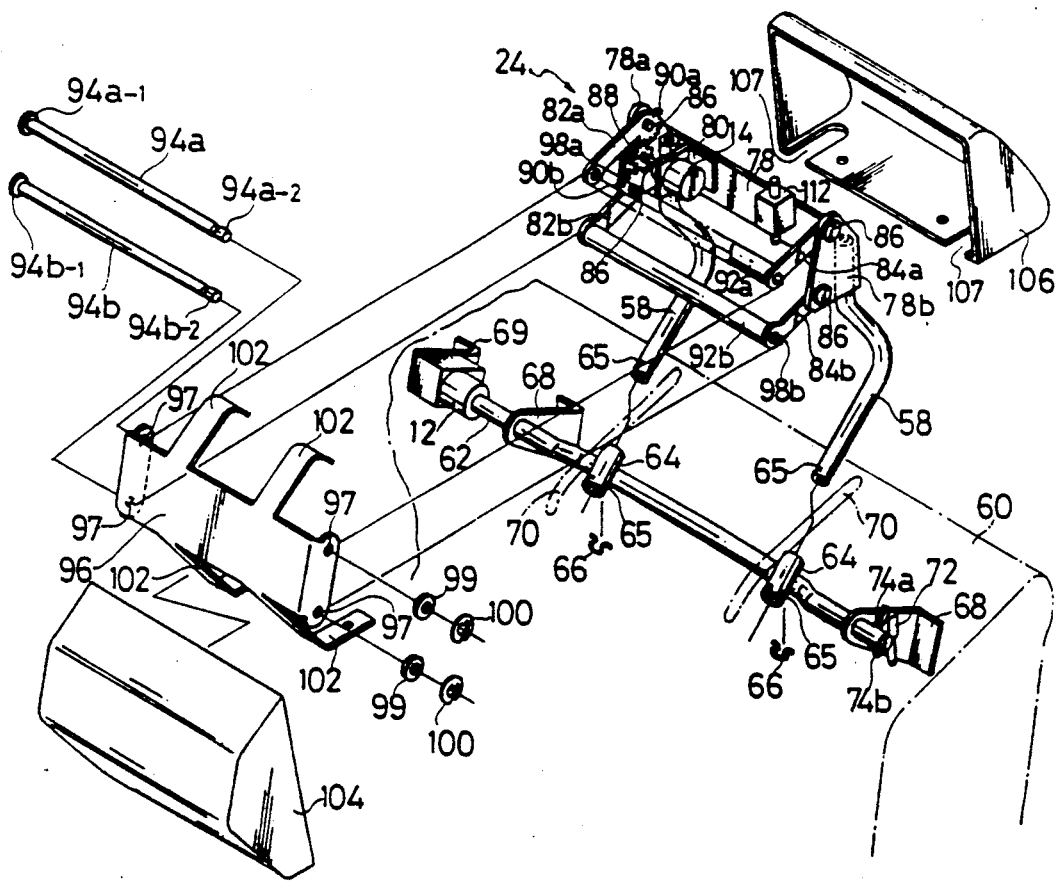
FIG. 6 is a partly broken, exploded perspective view of a drive mechanism for causing the movements of the headrest under the control of the controlling processes in accordance with the present invention.

As shown in FIGS. 3 and 6, the headrest (24) is provided with a pair of headrest stays (58)(58) and mounted on the stays (58)(58) above the top of the seat back (60). The two stays (58)(58) are formed from a tubular material and supported at the seat back (60) such that their respective lower ends are inserted in the two holders (64)(64) and secured firmly thereto by means of the two-shaped securing members (66)(66) which are each fitted in the cut-away portions (65)(65) of the holders (64)(64) respectively. The two holders (64)(64) are fixed on a support shaft (52) which are extended rotatably between a pair of spaced-apart brackets (68)(68) provided fixedly within the seat back (60). One end of the support shaft (52) is firmly connected to the output drive shaft of the headrest rotation motor (12) which is supported by a bracket (59) within the seat back (60).

On the top of the seat back (60), as in FIG. 6, are formed a pair of slits (70)(70) in a direction along the fore-and-aft movement of the headrest stays (58)(58) so that the stays (58)(58) pass through the respective slits (70)(70) and are movable along the longitudinal direction of the slits (70)(70).

Accordingly, with this structure, the shaft (62) is caused to rotate by the drive of the headrest rotation motor (12), which causes simultaneous rotation of the two stays (58)(58) and thus fore-and-aft rotation of the headrest (24) relative to the seat back (60). For example, in this connection, let it be assumed that, under such use position of the headrest (24) as in FIG. 5, the CPU (22) outputs to the first motor drive circuit (32) a control signal instructing the headrest rotation motor (12) to drive in a reverse direction. Then, the motor (12) is driven in the reverse direction to rotate the shaft (62) as well as the stays (58)(58) in likewise direction, and thus the headrest (24) is inclined down forwardly of the seat back (60) into the non-use position below the backward sight line 126) of the driver (P), as shown in FIG. 4.

Assuming further that, under such non-use position of the headrest (24), a control signal is output from the CPU (22), instructing the motor (12) to drive in a normal direction, to the first motor drive circuit (32), the motor (12) is then driven in the normal direction, as opposed to the reverse direction, to thereby rotate the shaft (62) and stays (58)(58) in a clockwise direction, as can be seen in FIG. 4, so as to rotate the headrest (24) from the non-use position as in FIG. 4 up to the use position as in FIG. 5, after which, the headrest (24) is lowered and returned to its initial head support position as shown in FIG. 3.

The above-stated fore-and-aft displacements of the headrest (24) are limited within an appropriate range by means of a first limit switch (72) in order for the headrest (24) to be precisely brought to either the use position or the non-use position. The shown limit switch (72) is a push switch having two switch-over knobs, and fixed at the right-side bracket (68). At the right-side free end of the shaft (62), are fixedly provided a pair of upper and lower pressing pieces (74a)(74b) such that, with the rotation of the shaft (62), either of the two pressing pieces is brought to contact with the corresponding one of the two switch-over knobs of the limit switch (72), pressing same into "on" state, which cuts a current flow in the headrest rotation motor (12) so as to stop it and limit the uppermost rotation range or lower most rotation range of the headrest (24). The first limit switch (72), as in FIG. 2, is electrically connected with the CPU (22) via an interface (76). Specifically, when either of the two switch-over knobs of the limit switch (72) is depressed by the corresponding one of the pressing pieces (74a)(74b), placing the limit switch (72) in a "on" state, a signal is emitted therefrom to the CPU (22), and then, the CPU (22) sends a control signal to the first motor circuit (32), instructing the headrest rotation motor (12) to cease its drive immediately, thereby preventing a further excessive upward or downward rotation of the headrest (24). The first limit switch (72) is not restricted to the illustrated one, but may be any other suitable one.

Referring to FIG. 6, the headrest elevating motor (14) is disposed within the headrest (24); in other words, the headrest (14) is fixedly supported by a motor bracket (80) fixed on a base bracket (78) which is extended fixedly between the upper end parts of the two headrest stays (58). The base bracket (78) is formed in a generally U-shaped configuration having two forwardly extending bent ends (78a)(79b). To the respective two ends (78a)(78b) of the base bracket (78), are pivotally connected two pairs of parallel links (82a, 82b)(84a, 84b). In other words, the base ends respectively of the two pairs of parallel links (82a, 82b)(84a, 84b) are pivotally connected via pins (86) in a rotatable manner. As shown, the base ends of the right-side parallel links (82a, 82b) are respectively formed with an upper sector gear (90a) and a lower sector gear (90b), wherein there is interposed a pinion gear (88) between the two sector gears (90a)(90b) in mesh with both of them, the pinion gear (88) being fixed to the output drive shaft of the headrest elevating motor (14). Further an upper connecting pipe (92a) having a through-bore (98a) therein is fixedly extended between the free ends of the two upper link members (82a)(84a) whereas a lower connecting pipe (92b) having a through-bore (98b) therein is likewise extended between the free ends of the two lower link members (82b)(84b). A front bracket (96) is pivotally attached to all the free ends of the two pairs of parallel links (82a, 82b)(84a, 84b) by means of the two securing rods (94a) (94b). More specifically, the two securing rods (94a)(94b) are formed at their respective one ends with circular heads (94a-1)(94b-1), and are inserted through the front bracket (96) and connecting pipes (92a)(92b) such that the two securing rods (94a)(94b) are respectively inserted through the holes (97) of the front bracket (96) as well as the through-bores (98a)(98b) of the two connecting pipe (92a)(92b), and at their respective free ends (92a-2)(94b-2) secured by means of securing members (99)(100) against removal through those holes and bores. The front bracket (96), as best seen in FIG. 6, has four mounting support members (102) to which are fixedly mounted a forward headrest frame half (104) and rearward headrest half (106) by means of suitable securing screws, whereupon there is produced a headrest frame within the headrest (24). Of course, as understandable from FIGS. 3 to 5, the headrest frame thus formed from the two frame halves (104)(106) is covered with a padding (108) and covering member (110), presenting the headrest (24). It is noted here that, as can be seen from FIG. 6, the rearward headrest frame half (106) is at its lower section formed with a pair of spaced-apart elongated cut-away portions (107)(107) in which the two headrest stays (58)(58) are respectively permitted to enter, thereby avoiding the interference of the frame against the movement of the stays (58)(58). Preferably, the electrical wiring of the headrest elevating motor (14) should be protected by a harness or the like and disposed within the stay (58).

Accordingly, with the above-described structure, the drive of the headrest elevating motor (14) causes rotation of the pinion gear (88), which in turn rotates the two sector gears (90a)(90b), thus causing vertical rotation of the two pairs of parallel links (82a, 82b)(84a, 84b) about their respective rotation centers at the numerals (86). Consequently, the headrest frame (104)(106) is raised or lowered, thus producing the vertical movements of the headrest (24). In this connection, referring to FIG. 3, let us assume now that, under such initial use position of the headrest (24), the CPU (22) outputs to the second motor drive circuit (33) a control signal instructing the reverse rotation drive of the headrest elevating motor (14). Then, the motor (14) works as such to rotate the pinion gear (88) in the counterclockwise direction, thereby causing likewise rotation of the two sector gears (90a)(90b) simultaneously, whereupon the parallel links (82a, 82b, 89a, 84b) are rotated upwardly about their respective rotation centers (86) to raise the front bracket (96) and thus the headrest (24) as shown in FIG. 5. Referring, on the other hand, to FIG. 5, assuming that, under such uppermost position of the headrest (24), the CPU (22) outputs to the second motor drive circuit (33) a control signal instructing the normal rotation drive of the motor (14), then the motor (14) works so, rotating the pinion gear (88) in a clockwise direction, thereby causing likewise rotation of the two sector gears (90a)(90b) simultaneously, and thus causing downward rotation of the parallel links (82a, 82b, ...) to lower the front bracket (95) and thus the headrest (24).

Like the foregoing headrest rotation motor (12), the headrest elevating motor (14) is also provided with a second limit switch (112) which limits the uppermost and lowermost levels of the headrest (24).

The second limit switch (112) is a push switch, like the first one (72), having a pair of upper and lower switch-over knobs, as shown. It is preferable that the switch (112) is fixed on the base bracket (78) and disposed such that the upper switch-over knob thereof is to be depressed by the upper mounting support member (102) when the headrest (24) is raised to an uppermost level, whereas the lower switch-over knob thereof is to be depressed by the lower mounting support member (102) when the headrest (24) is lowered to a lowermost level. However, the second limit switch (112) is not necessarily restricted to that arrangement, but may be arranged in any other proper manners. The switch (112) is electrically connected via an interface (114) with the CPU (22), as shown in FIG. 2. Hence, when the headrest (24) reaches a predetermined uppermost or lowermost level during its vertical movements, the depression of the second limit switch (112) by its contact with the mounting support member (102) turns "on" the switch (112) to emit a signal to the CPU (22), which then outputs to the second motor drive circuit (38) a control signal instructing the immediate stop of the headrest elevating motor (14), whereupon the motor (14) is ceased its drive so as to prevent further excessive upward or downward displacements of the headrest (24).

Although not shown, the headrest (24) may be provided two in number upon the seat back (60) of the rear seat (37), and the headrest control system (10) may therefore be provided independently two in number for controlling each of the two headrests. Such two-headrest arrangement are preferable as generally thought for a commonly used couch-type rear seat.

In FIG. 1, designation (116) presents a control container that may be used for containing the CPU (22), first and second motor drive circuits (32)(33), and is preferably provided within the rear-seat seat back (60).

Figure 7:
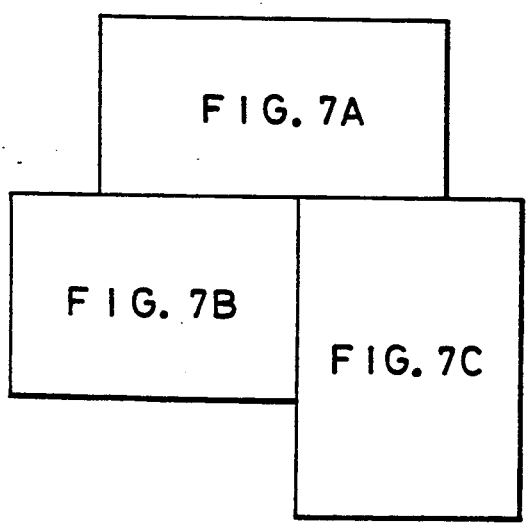
FIG. 7 is a block diagram providing the relative positions of FIG. 7A, 7B and 7C to show a flow chart in which the headrest controlling processes are explained.

Reference is, now, made to FIG. 7 which is broken down into FIGS. 7A, 7B and 7C and FIG. 8. The block flow chart views shown therein are dedicated to providing a general view of the programs set in the CUP (22) for effecting a proper control of the headrest (22). Hereinafter, a specific description will be made of the program and instruction flow in the headrest control system (10), by referring to the FIGS. 7 and 8.

Figure 7A:
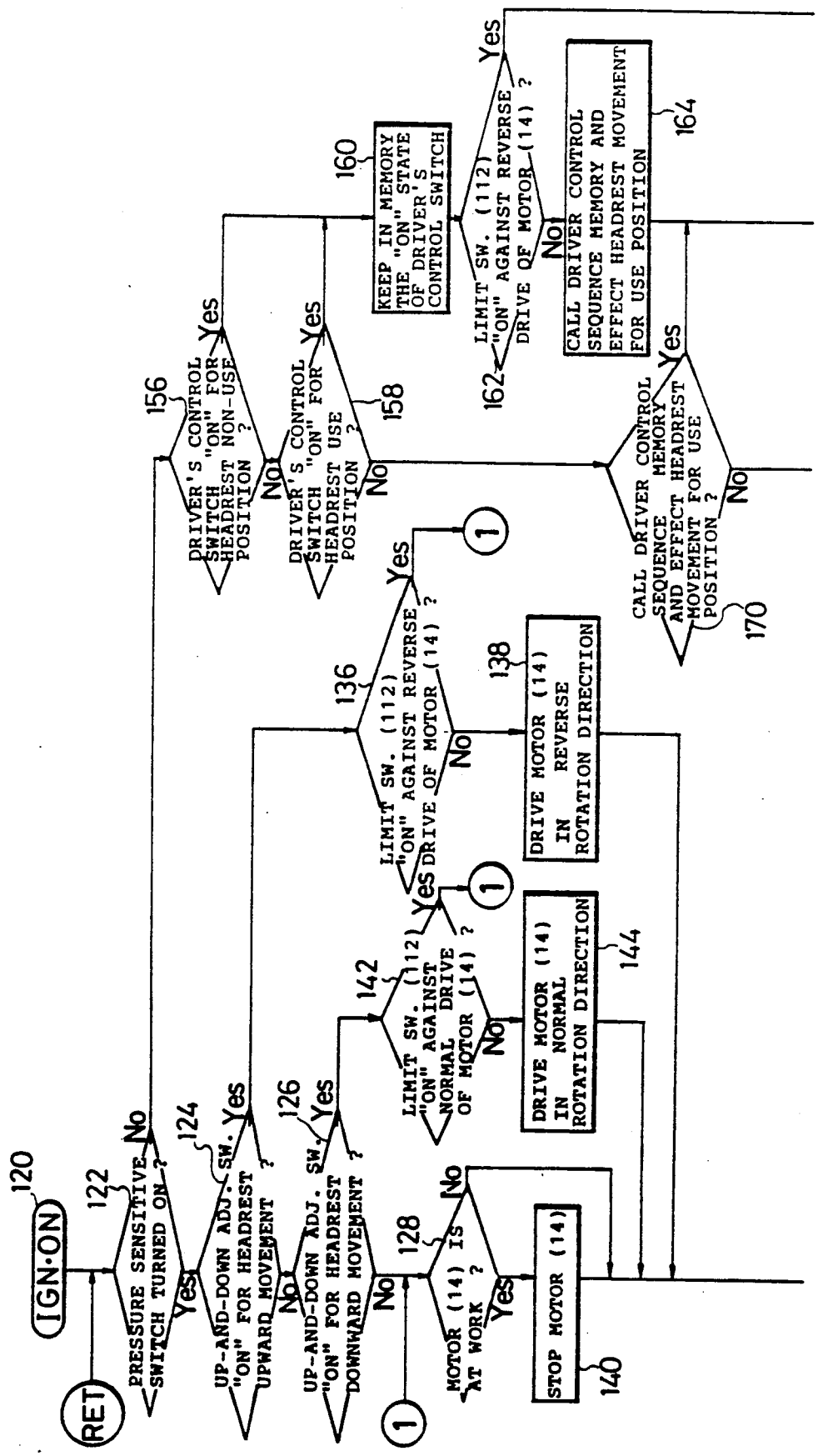
Figure 7B:
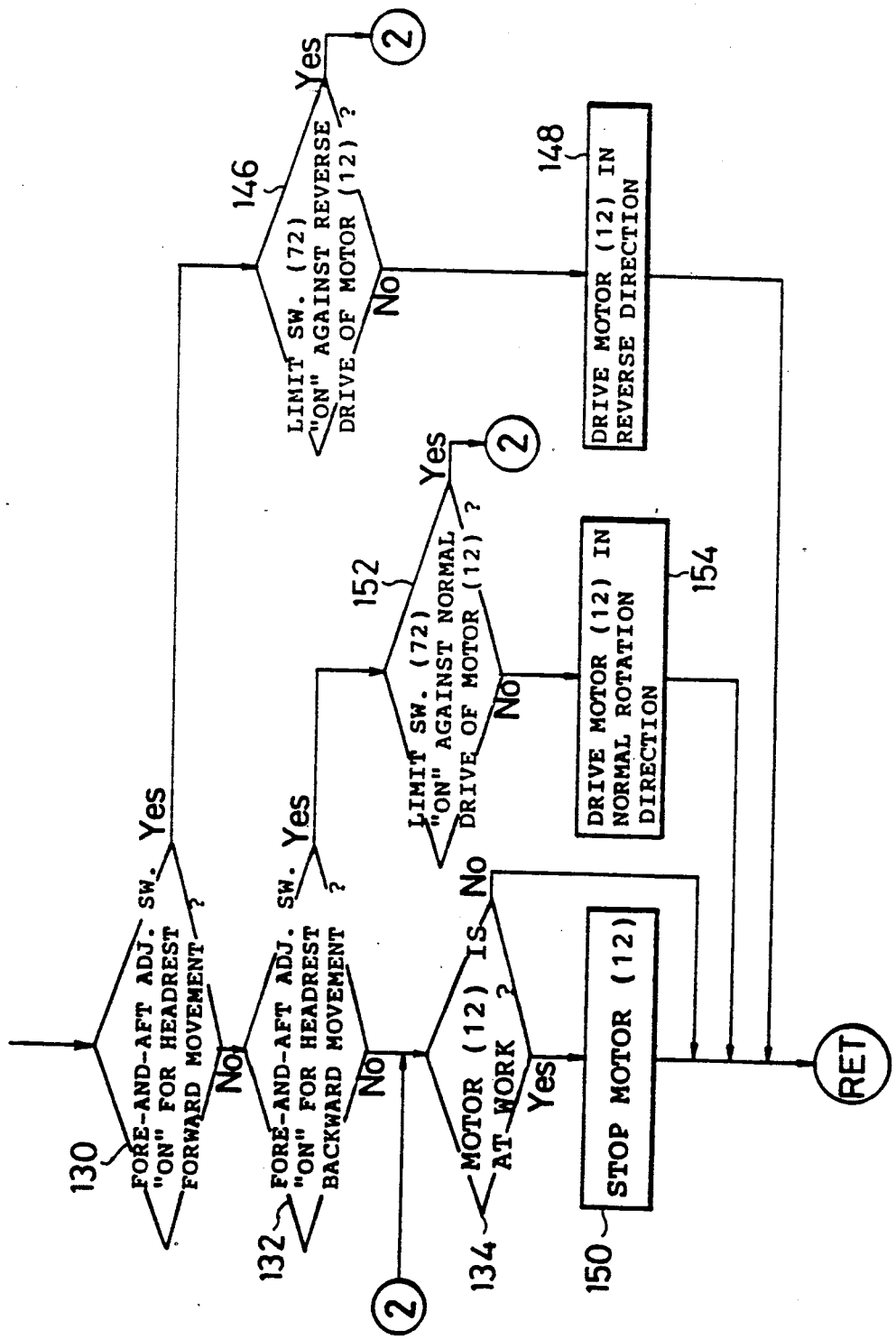
Figure 7C:
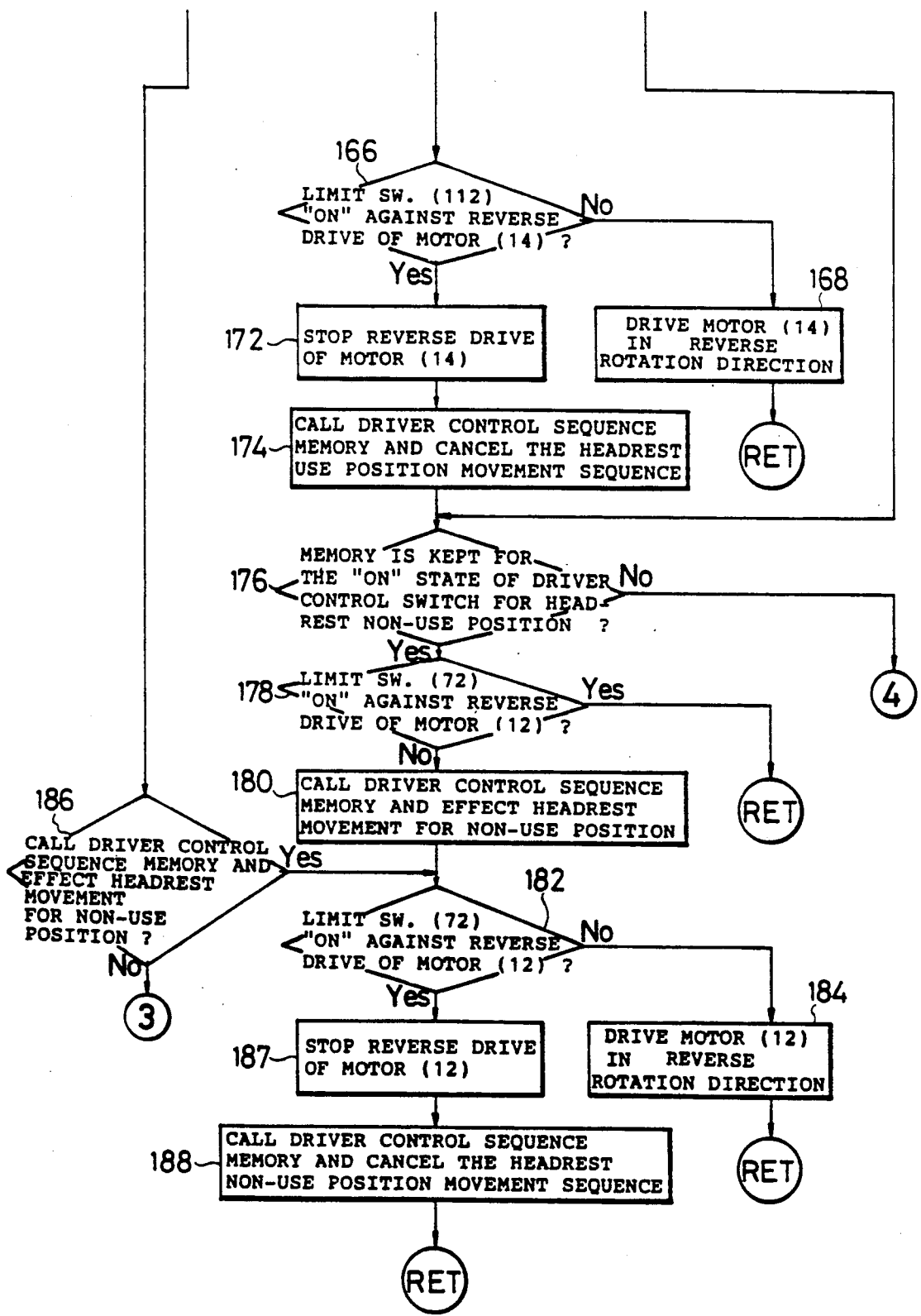

Firstly, referring to FIGS. 7A, 7B and 7C, numeral (120) stands for an initial instruction block associated with an ignition switch (44) (see FIGS. 1 and 2) for working the engine of the automobile (1), which ignition switch (44) serves also as a main switch for the headrest control system (10).

At the block (120), the turning-on of the ignition switch (44) takes place, and then a detection of a rear-seat occupant is made at the decision block (120) as to whether the pressure sensitive switch (50) is turned on or not. Here, let it be assumed for instance that an occupant is present on the rear seat (B), and thus the pressure sensitive switch (50) is turned "on" due to the downward pressure from the occupant. Then, the decision block (122) determines the "on" state of the switch (50) to be affirmative as "YES". Following such decision making, the process proceeds to decision blocks (122)(124) associated with the rear-seat occupants' adjustment switch means (18), where it is determined (i) whether the headrest up-and-down adjustment switch (20) is turned on for headrest upward adjustment or not, at the block (124), and (ii) the same is turned on for headrest downward adjustment or not, at the block (126), respectively. At this stage, if the switch (20) is not operated at all, decision will naturally be made in the negative as "NO" thorough both steps (124)(126), in which case, the process will go to a decision block (128), determining whether the headrest elevating motor (14) is or not, and apparently "NO" will be decided therein.

Under such condition, referring to FIG. 7B, a next step of decision is effected at two subsequent blocks (132)(134) as to whether the headrest fore-and-aft adjustment switch (19) is turned on for headrest forward adjustment or not at (132) and whether the switch (19) is turned on for headrest backward adjustment or not at (134). If the switch (19) is entirely inoperative at this stage, negative decision "NO" will naturally be made through both steps (132)(134). Then, since practically the relevant motor (12) is not at work, negative decision "NO" is also made at a subsequent step (134) for determining whether the motor (12) is driven or not.

Now, with the foregoing processes in mind, let us assume for example that, initially, with the headrest (24) located at its original use position as in FIG. 3, a rear-seat occupant operates the headrest up-and-down adjustment switch (20) in order to adjust the vertical position of the headrest (24). If the occupant, who wishes to raise the headrest (24) at a desired height level, turns on the switch (20) for headrest upward adjustment, then, at the block (124), an affirmative decision, "YES", is made, which leads the process flow to another decision block (136) where is determined whether or not the first limit switch (112) is "on" against reverse drive of the headrest elevating motor (14). Here, if the limit switch (112) is found "off" for such reverse rotation, a decision at that block (136) presents "NO", whereupon the process goes to an instruction block (138) associated with the reverse rotation drive of the headrest elevating motor (14), thus instructing the headrest elevating motor (14) to work on in a reverse rotation direction, and then, the motor (14) goes on working as such, causing upward movement of the headrest (24) until the first limit switch (112) is turned on by being contacted with the headrest frame member (102) against the reverse drive of the motor (14). During this stage, as the headrest fore-and-aft adjustment switch (19) stands inoperative, both associated decision blocks (130)(132) shown in FIG. 7B present negative decision "NO"; in other words, "NO" is decided at the former block (130) which determines whether the switch (19) is "on" or not for the headrest forward adjustment, and further, "NO" is decided at the latter block (132) which determines whether the switch (19) is "on" or not for the headrest backward adjustment. Accordingly, this serves to retain the stop of the relevant motor (12) (namely the headrest rotation motor (12)) in the middle of the foregoing headrest upward adjusting processes, and naturally the subsequent decision step (134), which determines whether or not the motor (12) is driven, offers negative answer, "NO".

When the headrest (24) reaches a predetermined highest level with the on-going reverse drive of the headrest elevating motor (14), the first limit switch (112) is turned on, by being in a contact relation with the headrest (24) as stated above, against the reverse drive of the motor (14), whereupon, at the block (136), the "on" state of the limit switch (112) is determined in the affirmative, as "YES", and the process flow turns to the block (128), in which is confirmed the actual drive of the motor (14), thus determining it as "YES" there, and responsive to such motor drive confirmation, at the next instruction block (140), the motor (14) is reduced to stop, whereby the headrest (24) is positioned at the given highest level.

In this context, assuming that, prior to such turning-on of the first limit switch (112), the rear-seat occupant turns off the headrest up-and-down adjustment switch (20) to stop the headrest (24) at a certain level, the process flow is turned to the associated two decision blocks (124)(126), both of which determine "NO" as to the two respective "on" questions of the switch (20), and then, after confirming the drive of the motor (14) as "YES" at the next block (128), the processing instructs the motor (14) at the instruction block (140) to stop its drive, so that the headrest (24) is positioned at the given height level.

Taking now another assumption that, after the headrest (24) is located at the highest level, the rear-seat occupant turns on the headrest up-and-down adjustment switch (20) for headrest downward adjustment, then the associated decision blocks (124)(126) give "NO" and "YES" respectively, and the process flow goes to a decision block (142), where it is determined whether the first limit switch (112) is turned on against the normal drive of the motor (14), or not. Since actually the switch (112) is in "off" state thereagainst, the block (142) determines "NO", and responsive thereto, at a subsequent instruction block (144), the motor (14) is instructed to keep driving in the normal rotation direction so as to lower the headrest (24) until the first limit switch (112) is turned on against such normal rotation drive of the motor (14). Thereafter, when the headrest (24) reaches a predetermined lowest level, turning on the first limit switch (112) against the normal rotation drive of the motor (14), then "YES" is decided at the block (142), and after confirming the actual drive of the motor (14) at (128), the motor (14) is stopped its normal rotation drive, whereby the headrest (24) is located at the lowest level, i.e. the initial use position as in FIG. 3.

With the headrest (24) in such use position, if it is assumed that the headrest fore-and-aft adjustment switch (19) is turned on for headrest forward adjustment in order to adjust the forward position of the headrest (24), without operation of the headrest up-and-down adjustment switch (20), then the process flow passes, with negative decision as "NO" through the three consecutive blocks (124)(126)(128) associated with the up-and-down adjustment switch (20), and proceeds to the associated block (13) as shown In FIG. 7B, which determines the "on" state of the fore-and-aft adjustment switch (19) to be affirmative as "YES". Then, a next process takes place at the block (146) associated with the second limit switch (72), in which is determined whether or not the second switch (72) is turned on against the reverse rotation drive of the relevant headrest rotation motor (12). If "NO" is decided at the block (146), the process is subject to an instruction for keeping the reverse rotation drive of the motor (12), at the instruction block (148), to thereby rotatively displace the headrest (24) to a predetermined most forward point until the second limit switch (72) is turned on against the reverse rotation drive of the motor (12) by being depressed by the lower pressing piece (74b). Then, when the headrest (24) reaches the most forward point with the reverse rotation drive of the motor (12), the second limit switch (72) is turned on as stated earlier, which answers "YES" at the block (146), to thereby turn the process flow to the block (134), and, after confirming the drive of the motor (12) as "YES" there, an instruction for stopping the motor (12) is given at the block (19). Consequently, the motor (12) ceases its reverse rotation drive, thereby stopping the headrest (24) at the given most forward point.

In this context, assuming now that, prior to such turning-on of the second limit switch (72), the rear-seat occupant turns "off" the headrest fore-and-aft adjustment switch (19) to stop the forward displacement of the headrest (24) at a certain point, then a negative decision "NO" is made at both associated decision blocks (130)(135), and after confirming the actual drive of the headrest rotation motor (12) as "YES" at the subsequent block (134), the process flow is given an instruction, at (150), for ordering the motor (12) to stop its reverse rotation drive, as a result of which the motor (12) is stopped and the headrest (24) is positioned at a desired forward point, as can be understood from FIG. 3.

Assuming further that the rear-seat occupant turns "on" the adjustment switch (19) for headrest backward adjustment to return the headrest to the Initial use position, the process flow then undergoes negative "NO" decision at the block (130) and affirmative "YES" decision at the block (132), respectively, indicating the normal rotation drive of the headrest rotation motor (12), at which time, the second limit switch (72) is being "off" against the normal rotation drive of the motor (12). Thus, the process flow is turned to a decision block (152) associated with the second limit switch (72), at which "NO" is decided because of the switch (72) being in such "off" state, and subject to the instruction block (154) for instructing the motor (12) to keep driving in normal rotation direction to cause backward displacement of the headrest (24) to the initial use position until the second limit switch (72) is turned on against the normal rotation of the motor (12) by being depressed by the upper pressing piece (74a). When the headrest (24) reaches the initial use position, the second limit switch (72) is turned on against the normal rotation drive of the motor (12) via the upper pressing piece (74a), "YES" is decided at a block (152) which determines whether for the switch (72) to be "on" against such normal drive. Then, after confirming the drive of the motor (12) at (134) as "YES", the process flow goes to the instruction block (150) where the motor (12) is instructed to stop its drive, with the result that the headrest (24) is stopped at the initial use position.

In this connection, let us further assume that prior to such turning-on of the second limit switch (112) against the normal drive, the rear-seat occupant turns "off" the headrest fore-and-aft adjustment switch (19), then the block (132) presents a negative decision "NO", and after confirming the drive of the relevant motor (12) as "YES" at the next block (134), the flow of process is finally subject to the instruction at the block (150) to stop the motor (12), whereby the headrest (24) is located at a certain use position in the fore-and-aft direction relative to the seat back (60), permitting thus the occupant to attain a desired head support position of the headrest (24) in the fore-and-aft direction.

The absence of occupant in the rear seat (37) leaves the pressure sensitive switch (50) "off", which supports a negative decision "NO" in the associated block (122). Accordingly, as seen in FIG. 7A, any procedure for operating both headrest fore-and-aft and up-and-down switches (19)(20) is blocked and will not be followed as above.

Then, referring to FIG. 7A, the process flow is led to other decision blocks (156)(158) associated with the driver's control switch (17), where it is determined (i) whether the switch (17) is turned on for headrest non use position or not, at (156), and (ii) whether it is turned on for headrest use position or not, at (158), respectively.

Assuming now for instance that the driver (P) turns on the switch (17) for headrest non use position, then "YES" is decided at the block (156), which leads the process flow to a memory block (160) where such "on" state of the switch (17) is stored in memory. Thereafter, at a next block (162), it is determined whether or not the first limit switch (112) is turned on against the reverse drive of the headrest elevating motor (14). If the switch (112) is "off", a negative decision "NO" is made at that block (162). Then, the process flow goes to a headrest upward motion block (164) associated with the foregoing driver control sequence memory area in the CPU (22), in which block (164), is called the relevant memorized sequence for causing the upward movement of the headrest (24), to thereby give an instruction for the headrest (24) to move upwardly towards the predetermined highest level. Before executing such instruction, referring to FIG. 7C, it is checked up at a block (166) whether or not the first limit switch (112) is turned on against the reverse rotation drive of the motor (14), and if "NO" is determined at that block (166), the process turns to an instruction block (168), in which the motor (14) is instructed to keep driving in the reverse rotation direction so as to raise the headrest (24) until the first limit switch (112) is turned against the reverse drive of the motor (14).

At this state, it should be noted that the flow of process is returned to the initial stage beginning with the first decision block (156) as shown in FIG. 7A, and block (158), determining whether the same is turned on or not for headrest non-use position at (158). However, because the "on" state of the switch (17) is memorized at (160), both of the two blocks (156)(158) present "NO". Then, the process goes to a decision block (170) related to the driver's control sequence, in which it is determined whether the sequence is "on" for headrest use position, or not. If "YES" is decided there, it is confirmed at (166) whether the first limit switch (112) is turned on or not against the reverse drive of the motor (14).

Now, turning to the headrest (24) being raised as stated earlier, when it reaches the predetermined highest level, the first limit switch (112) is turned on against the reverse drive of the motor (14), and at the block (166), "YES" is decided. As a result, an instruction block (172) instructs the motor (14) to stop its drive. As the motor (14) ceases driving, a next instruction block (174) associated with the foreging driver control sequence memory area is followed, in which an instruction is given to stop the upward movement of the headrest (24). Then, it is checked up at a block (176) whether or not the turning-on of the driver's control switch (17) for headrest non-use position is kept in memory. If "YES" is decided there, the process goes to a block (178), where is determined whether or not the second limit switch (72) is turned on against the reverse drive of the headrest rotation motor (12). However, in view of the fact that the headrest (24) is located at the highest level at the use position, having no relation with the motor (12), naturally at that block (178), "NO" is decided, whereupon the process goes to a decision block (180) associated with the driver control sequence memory area, in which is called a memorized non-use position sequence for causing the headrest (24) to move in the non-use position, to thereby give an instruction for the headrest (24) to move in the non-use position. Then, at a block (182), it is checked up again whether the second limit switch (72) is turned on against the reverse drive of the motor (12) or not. If "NO" is decided there, at an instruction block (184), the motor (12) is instructed to keep driving in the reverse rotation direction so as to cause the rotation of the headrest (24) towards the non-use position until the second limit switch (72) is turned on against the reverse drive of the motor (12). When the headrest (24) reaches the non-use position, the second limit switch (72) is turned on against the reverse drive of the motor (12), whereupon at an associated decision block (182), "YES" is decided, and a subsequent instruction block (187) gives an instruction to stop the motor (12). As a result, at a block (188), an instruction is given to stop the on-going headrest non-use position sequence, and thus, the headrest is stopped and located in the given non-use position.

Assuming then that, from such non-use position, the driver (P) turns on the driver's control switch (17) for headrest use position so as to cause the headrest (24) to move towards the use position, the process flow, by referring to FIG. 7A, goes to the block (156), which decides "NO", and then to a block (158) where it is determined whether or not the control switch (17) is turned on for headrest use position and "YES" is decided there. Then, at the memory block (160), is kept in memory such "on" state of the switch (17). The process flow undergoes, at the block (16), the determination as to whether nor not the first limit switch (112) is turned on against the reverse drive of the motor (14). However, due to the headrest (24) being extended already at the highest level even in such non-use position, the block (162) presents "YES", whereby the process flow is jumped to the block (175) in which it is checked up whether or not the "on" state of the switch (17) for headrest non-use position remains in memory, and "NO" is decided there. As a result, an instruction is given at (188) to stop the on-going memorized sequence for the headrest non-use motion.

Figure 8:
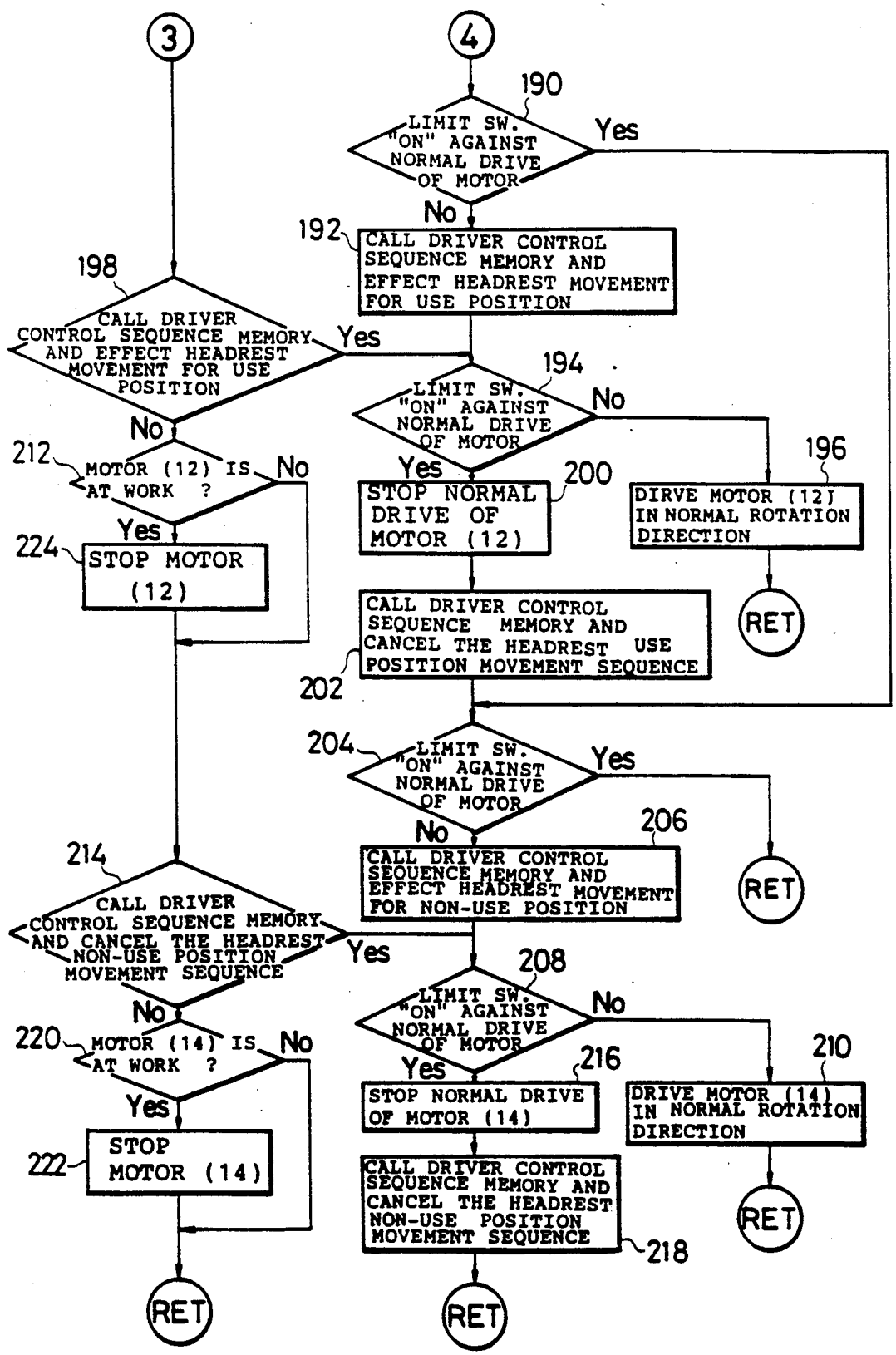
FIG. 8 is a flow chart diagram continued from the FIG. 7C.

Then, referring to FIG. 8, the process flow proceeds from the connecting symbol (4) at FIG. 7C to the one at the FIG. 8, and undergoes, at a block (190), the determination as to whether or not the second limit switch (72) is turned on against the normal drive of the headrest rotation motor (12). If "NO" is decided where, the process is then led to an instruction block (192) related to the driver control sequence memory area, in which is called a memorized headrest return sequence for causing the return of the headrest (24) to the use position, so as to give an instruction for the headrest (24) to return to the use position from the non-use one. Before executing such sequence, it is checked up at (194) again whether the second limit switch (72) is turned on, or not, against the normal drive of the motor (12). If "NO" is decided there, then at block (196), the motor (12) is instructed to drive in the normal rotation direction, which causes the return of the headrest (24) to the use position.

During such return of headrest (24), the process is returned to the initial block flows involving the blocks (122), (156), (158), (170) and (186) as in FIGS. 7A and 7C, and proceeds all therethrough with negative "NO" decision, and consequently is led from the connecting symbol (3) at FIG. 7C to the one at FIG. 8 wherein, at a block (198), the on-going headrest return sequence is confirmed as "YES". Then, when the headrest (24) reaches the non-use position, with the second limit switch (72) being turned on against the normal drive of the motor (12), an associated block (194) presents "YES", which leads to an instruction at a block (200) for stopping the drive of the motor (12), as a result of which the headrest return sequence is erased from the present process at an instruction block (202), whereby the headrest (24) is located at the given use position Thereafter, at a next block (204), it is determined whether the first limit switch (112) is turned on, or not, against the normal drive of the headrest elevating motor (l4). Since the headrest (24) is already raised at the highest level, "NO" is decided at that block (204). Responsive thereto, the process flow goes to a block (206) related to the headrest control sequence memory area, in which is called a memorized headrest lowering sequence for causing the downward movement of the headrest (24) upon the seat back (60), and is given an instruction to that effect. Then, it is checked up at a block (208) whether or not the second limit switch (112) is turned on against the normal drive of the motor (14). If "NO" is decided there, an instruction is given at a block (210) to drive the motor (14) in the normal rotation direction, whereby the headrest (24) is lowered relative to the seat back (60).

During such lowering of the headrest (24), likewise as in the foregoing return thereof, the process goes back to the initial block flows involving the blocks (122), (156), (158), (170) and (186) as in FIGS. 7A and 7C, and passes all therethrough with negative decision "NO". Then, after "NO" is decided at the next block (198), a determination is made at a block (202) as to whether the headrest rotation motor (12) is driven or not. As the motor (12) in not at work at this point, naturally "NO" is decided at that block (202). The process flow then proceeds to a block (214) in which it is checked up whether the headrest lowering sequence is executed or not. After confirming it as "YES" there, it is further checked up at (208) whether the first limit switch (112) is turned on, or not, against the normal drive of the motor (14). When the headrest (24) reaches the lowest level, the first limit switch (112) is turned on against the normal drive of the motor (14), which decides "YES" at that block (208), and consequently, an instruction block (216) following it gives an instruction for the motor (14) to stop its normal rotation drive. Then, a further instruction is given at a block (218) to cancel the headrest lowering sequence, whereupon the headrest (24) is located at the given initial use position as shown in FIG. 3, thus completing the return of the headrest (24) to that use position by way of the driver's control switch (17).

Now, let us assume that a rear-seat occupant is present in the rear seat (37) and operates the headrest up-and-down adjustment switch (20) to adjust the upward or downward position of the headrest (24). If the occupant stands up from the seat (37),in the middle of such operation, the pressure sensitive switch (50) is turned off, and therefore, referring to FIG. 7A, at the block (122), decision is changed from "YES" to "NO". Then, the process flow goes with negative decision "NO" all through the subsequent blocks (156)(158)(170)(186)(198) (see also FIGS. 7C and 8). At a block (212) following the block (198), it is checked up whether the headrest rotation motor (12) is driven or not. As the motor (12) is not at work, "NO" is answered there, and even at the next block (214) associated with the driver control sequence memory area, "NO" is decided because of no operation at the driver's control switch (17). Thereafter, the process undergoes the determination at a block (220) as to whether the headrest elevating motor (14) is driven or not, and due to the motor (14) being at work at the present moment, naturally "YES" is answered there. Thus, at a block (222) an instruction is made to stop the drive of the motor (14), whereby it is seen that the sudden absence of rear-seat occupant during headrest up-and-down adjustment will assuredly stop the vertical movement of the headrest (24).

The abovementioned process applies also in the case of the headrest fore-and-aft adjustment switch (19): That is, supposing that, during operation of the switch (19), an occupant doing it leaves from the rear seat (B), the turning-off of the pressure sensitive switch (50) takes place, which leads the process flow, as in FIGS. 7A and 7C, to the same series of blocks (122)(156)(158)(170)(186), and "NO" is answered all through them, and even at the block (198) in FIG. 8, "NO" is decided. Then, the fact that the headrest rotation motor (12) is being at work at this point, gives a "YES" answer at the block (212), and consequently, at a block (224) following such decision, an instruction is given to stop the drive of the motor (12). Thus, it is seen that the sudden absence of occupant from the rear seat (B) will assuredly stop the fore-and-aft movement of the headrest (24).

Furthermore, let it be supposed that an occupant suddenly sits on the rear seat (B) just while the driver (p) is in the act of operating the headrest control switch (17) for displacement of the headrest (24) between the use and non-use positions. The turning-on of the pressure sensitive switch (50) takes place. Thus, as in FIG. 7A, the block (122) presents "YES" answer. At this point, neither the headrest fore-and-aft adjustment switch (19) nor the headrest up-and-down one (20) are operated by the rear-seat occupant. Therefore, the process flow passes with negative answer "NO" through the subsequent blocks (122)(124). The same goes for the two blocks (130) (132). But, the process flow is led to the main relevant blocks (128) and (134), wherein the former (128) determines whether or not the headrest elevating motor (12) is driven, whereas the latter (134) determines whether or not the headrest rotation motor (14) is driven. Now, if either of the motors (12)(14), is being at work for effecting the corresponding displacement of the headrest (42) from the use position to the non-use one or vice versus, then "YES" is answered at either of those two blocks (128)(134). As a result, at either of the subsequent blocks (140)(150), is given an instruction for stopping the drive of the corresponding one of the motors (12) (14). Accordingly, where an occupant suddenly sits on the rear seat (B), the driver's control of the headrest (24) between the use and non-use positions is interrupted so as to cease the motion of the headrest (24), preventing thus a possible danger of the rear-seat occupant being injured by the headrest (24).

From the descriptions above, it is appreciated that the following advantages are found in the present invention.

(i) When the driver (P) on the front seat (A) turns on the driver's control switch (17) for headrest non-use position, the headrest (24) is firstly raised from the seat back (60) at its use position, so as to make longer the radius of a circle along which the headrest (24) is rotated relative to the rotation center at (62), as shown in FIG. 5, and then rotatively displaced down from the use position forwardly of the seat back (60) towards the non-use position, as in FIG. 4. Further, when the switch (17) is turned on for headrest use position in order to return the headrest (24) to the initial non-use position from the use position, the headrest (24) is displaced upwardly, maintaining such greater rotation radius, to its use position and then lowered to the seat back (60), completing its location at the initial use position. Accordingly, it is seen that, during the displacement between the use and non-use positions, the bottom of the headrest (24) is kept from contact with the upper surface of the top of the seat back (60), and thus, there is eliminated the wear or abrasion problem with the covering members of both headrest (24) and seat back (60). Moreover, the abovementioned counterpressure problem between the headrest's padding and the one of the seat back is avoided, so that it is no longer necessary to provide a large-sized motor, or rather a small-sized one with a relatively smaller force may be installed in the present invention, thus permitting use of a light-weight oriented motor.

(ii) In addition to the above-stated driver's control switch (17), there are provided the headrest fore-and-aft and up-and-down adjustment switches (19) (20) which are operated by an occupant on the rear seat (B). Thus, while the driver (p) can attain his or her clear backward view field, the rear-seat occupant can also use those two switches (19)(20) to adjust the position of the headrest (24) in a direction forwardly and backwardly of the seat back (60) as well as vertically relative thereto, thereby attaining a desired position of the headrest (24).

(iii) The pressure sensitive switch (50) in the rear seat (B) detects the presence or absence of an occupant thereon. Depending on such rear-seat occupant detection, the CPU (22) controls the signals sent from the driver's control switch (17), headrest fore-and-aft adjustment switch (19) and headrest up-and-down adjustment switch (20) so as to avoid a signal confusion and interference among those switches. In other words, if an occupant is present on the rear seat (B), the CPU (22) blocks any signal from the driver's control switch (17) to thereby prohibit the use thereof, and only permit the rear-seat occupant to operate the two adjustment switches (19) (20), whereby irrespective of the driver (P), only the rear-seat occupant may adjust the headrest (24) at a desired position. On the other hand, if no occupant is seated in the rear seat (B), the CPU (22) then blocks any signal from the two adjustment switches (19)(29), thereby permitting only the front-seat driver (P) to operate the control switch (17) so as to cause the displacement of the headrest (24) between the use and non-use positions. Accordingly, even if the driver (P) by mistake turns on the control switch (17), with an occupant present on the rear seat (B), the headrest (24) is automatically prevented against movement, and no harm or no uneasy psychological state is given to the rear-seat occupant.

(iv) The headrest control system in the present invention is very sensitive to the slight movement of the rear-seat occupant, and when he or she unintentionally stands up from the rear seat (B) for some small actions within the automobile (1), any on-going movement of the headrest (24) is stopped to avoid a damage or injury at the occupant side due to the headrest.

While having described the present invention as above, it should be understood that the invention is not limited to the illustrated embodiment but any other modifications, replacements and additions may structurally be possible without departing from the spirits and scopes of the appended claims. For example, the headrest rotation motor (12) and headrest elevating motor (14) may be DC geared motor. The present invention may be used in a two-door type automobile by mounting the headrest (24) on the rear seat thereof, instead of the illustrated four-door automobile. For such automobile as a van, in which the rear seat is frequently used as a load-carrying area, there may be provided another driver's control switch adapted for turning on or off the pressure sensitive switch (50), so that the front-seat driver may cancel the automatic prohibition of the driver's control of the headrest (24) effected by the "on" of the pressure sensitive switch (50). This permits the driver to cause the headrest (24) to move towards the non-use position, even if the turning-on of the switch (50) gives an instruction through the CPU (22) to block any signal from the control switch (17). In that case, it may be so arranged that such turning-off of the pressure sensitive switch (50) is cancelled by other suitable switch to keep the switch (50) in an operative state, to thereby permit its detection of a rear-seat occupant.

What is claimed is:

1. A method for controlling a headrest, in which said headrest is mounted on a seat back of a rear seat in an automobile and rotatively displaceable between a use position for supporting a head of an occupant on said rear seat and non-use position below a backward visual field of a driver on a front seat, and there is provided a headrest control system for effecting such headrest displacement, said method comprising the steps of:

raising said headrest at said use position by means of a headrest elevating motor with a first drive control, when said headrest is instructed to displace towards said non-use position said headrest is raised to a minimum extent required so that when said headrest is displaced around the adjacent portion of the seat back said headrest does not contact said seat back, wherein said drive control is included in said headrest control system;

then, rotatively displacing said headrest towards said non-use position by means of a headrest rotation motor with a second drive control therewith which is included in said headrest control system;

after completing such displacement of said headrest to said non-use position, when said headrest is instructed to return to said use position, said headrest is displaced back towards said use position which permits said head rest to be moved correctly against said seat by means of said headrest rotation motor with said second drive control; and thereafter, lowering said headrest to an initial use position by means of said headrest elevating motor with said first drive control.

2. An apparatus for performing the method as defined in claim 1, wherein there is provided a driver's control switch by which said driver may control said displacement of said headrest between said use position and non-use position, wherein there is further provided a headrest fore-and-aft adjustment switch and a headrest up-and-down adjustment switch by which said occupant on said rear seat may adjust a position of said headrest in a direction forwardly and backwardly as well as vertically relative to a seat back of said rear seat, and wherein said headrest displacement and headrest fore-and-aft and up-and-down adjustment are effected independently of each other.

3. The method as defined in claim 1, wherein said method further includes the steps of detecting a presence or absence of said occupant on said rear seat; if said occupant is absent on said rear seat, permitting only said driver to effect said headrest displacement between said use and non-use positions; and if said occupant is present on said rear seat, permitting only said occupant to effect an adjustment of said headrest in a direction forwardly and backwardly and vertically relative to a seat back of said rear seat.

4. The method as defined in claim 3, wherein there is provided a driver's control switch by which said driver may effect said headrest displacement between said use and non-use positions, and wherein are further provided a headrest fore-and-aft adjustment switch and a headrest up-and-down adjustment switch by which said occupant on said rear seat may effect said adjustment of said headrest in said direction forwardly and backwardly and vertically relative to said seat back of said rear seat.

5. The headrest control device as defined in claim 4, wherein movement of a rear seat occupant causes ceasation of said headrest control disposed at a location accessible by said driver.

6. A headrest control device, in which said headrest is mounted on a seat back of a rear seat in an automobile and rotatively displaceable between a use position for supporting a head of an occupant on said rear seat and a non-use position below a backward visual field of a driver on a front seat, said headrest control device comprising:

a means for allowing said headrest to be raised and lowered at said use position;

a rotation motor for causing said rotative displacement of said headrest;

an elevating motor for causing a raising and lowering of said headrest;

a first drive circuit associated with said rotation motor;

a second drive circuit associated with said elevating motor;

a headrest control switch disposed at a location easily accessible by said driver, said headrest control switch being operable by said driver to control a drive of said rotation motor in order to cause raising said head rest from said use position, then displacing said head rest to said non-use position, whereas returning said headrest from said use position and lowering same to said initial use position of said seat back;

a headrest adjustment switch means disposed at a location easily accessible by said occupant on said rear seat, said switch means being operable by said occupant to control each of said rotation motor and elevating motor in order to effect an adjustment of said headrest in a direction forwardly and backwardly as well as vertically in reference to said initial use position upon said seat back;

a first limit switch for limiting a rotation range of said headrest;

a second limit switch for limiting a vertical range in which said headrest is raised and lowered; and a central processing unit which processes an input according to a predetermined program and outputs a control signal to each of said first drive circuit and second drive circuit so as to control drives respectively of said rotation and elevating motors;

whereby operation of said headrest control switch causes drives of said rotation and elevating motors to effect said headrest displacement between said use and non-use positions, and operation of said headrest adjustment switch causes said drives to adjust a position of said headrest in a direction forwardly and backwardly as well as vertically relative to said rear seat.

7. The headrest control device as defined in claim 6, wherein a pair of headrests are mounted on said rear seat such that each of them is operable independently of each other.

8. The headrest control device as defined in claim 6, wherein movement of a rear seat occupant causes ceasation of said headrest control disposed at a location accessible by said driver.

9. A method for controlling a headrest, in which said headrest is mounted on a seat back of a rear seat in an automobile and rotatively displaceable between a use position for supporting a head of an occupant on said rear seat and non-use position below a backward visual field of a driver on a front seat, and there is provided a headrest control system for effecting such headrest displacement, said method comprising the step of:

raising said headrest at said use position by means of a headrest elevating motor within said headrest with a first drive control, when said headrest is instructed to displace towards said non-use position said headrest is raised to a minimum extent required so that when said headrest is displaced around the adjacent portion of the seat back said headrest does not contact said seat back, wherein said drive control is included in said headrest control system;

then, rotatively displacing said headrest towards said non-use position by means of a headrest rotation motor within the seat back with a second drive control therewith which is included in said headrest control system;

after completing such displacement of said headrest to said non-use position, when said headrest is instructed to return to said use position, said headrest is displaced back towards said use position which permits said headrest to be moved correctly against said seat by means of said headrest rotation motor with said second drive control; and thereafter, lowering said headrest to an initial use position by means of said headrest elevating motor with said first drive control.

10. A headrest control device according to claim 6, wherein said rotation motor is provided in said seat back and said elevating motor is located within said headrest.

* * * * *